United States Patent Office 3,056,768
Patented Oct. 2, 1962

3,056,768
VINYL CHLORIDE COPOLYMERS AND METHODS OF MAKING THE SAME
Andrew J. Foglia, Brooklyn, N.Y., assignor to Air Reduction Company, Incorporated, New York, N.Y., a corporation of New York
No Drawing. Filed Dec. 29, 1959, Ser. No. 862,469
5 Claims. (Cl. 260—86.3)

This invention relates to a new process for copolymerizing monomeric vinyl chloride and a monomer capable of being copolymerized therewith to form true or uniform copolymers. More particularly the process of this invention comprises the introduction of gaseous vinyl chloride monomer into a reaction zone containing a monomer capable of being copolymerized with vinyl chloride and which also has a vapor pressure of about zero and in which the vinyl chloride monomer is introduced into the reaction zone at a pressure lower than the saturation pressure of the monomeric vinyl chloride in the presence of the reaction medium under the reaction conditions being employed. The invention further includes the novel vinyl chloride copolymers so produced.

Polyvinyl chloride when formed into useful articles such as unsupported films is a fairly stiff plastic and must be plasticized to give the article so formed a practical measure of flexibility. The plasticizers commonly used to impart flexibility to polyvinyl chloride are generally referred to in the art as external plasticizers since they are merely physically mixed with the polyvinyl chloride and do not in any way form a part of the polyvinyl chloride molecule. Examples of such external plasticizers in common use today include dioctyl phthalate and dicapryl phthalate.

The use of such external plasticizers with polyvinyl chloride has not proved to be entirely satisfactory. Articles formed from externally plasticized polyvinyl chloride are not normally homogeneous and they tend to lose the plasticizer and become stiff or less flexible and are not generally dimensionally stable. This loss of plasticizer, especially through aging, is generally referred to in the art as bleeding. The loss of or the bleeding of the plasticizer from the article not only renders the article so formed stiff and non-flexible, but the plasticizer which is lost often stains, discolors or otherwise adversely affects other materials which may be in contact with it. Since the plasticization of polyvinyl chloride is a physical mixture, the amount of plasticizer which can be incorporated with any given amount of polyvinyl chloride is also necessarily limited.

Prior attempts to copolymerize vinyl chloride and other monomers copolymerizable therewith such as vinyl esters of fatty carboxylic acids have resulted in failure. When attempts are made to copolymerize these reactants in solution for example the products are extremely non-uniform, soft, opaque and contain numerous spots and fish eyes.

It is an object of this invention to produce a polyvinyl chloride copolymer which possesses flexibility as well as the other properties of an externally plasticized polyvinyl chloride and which flexibility, as well as the other properties, will not deteriorate upon aging of articles formed therewith. The copolymers produced according to this invention can readily be formed into clear films and other products which are uniform and free from spots and fish eyes.

Generally the process of this invention involves the introduction of monomeric vinyl chloride in the gaseous state into a reaction zone containing a copolymerizable monomer having a vapor pressure of about zero. The vinyl chloride monomer is introduced into the reaction zone at such a rate that the pressure in the reaction zone is maintained at a level which is lower than the saturation pressure of the vinyl chloride monomer in the reaction medium in the presence of the copolymerizable monomer at the copolymerization temperature being employed. Although the copolymerization reaction can be performed at different pressures which will in turn result in the production of different copolymers containing more or less vinyl chloride, it is important to maintain the selected pressure substantially constant throughout the reaction. The conditions used should be such so as to maintain the vinyl chloride monomer in the gaseous state throughout the reaction except for a very small amount in the copolymerization zone which will be in the liquid state. By maintaining a constant vinyl chloride pressure, the amount of vinyl chloride dissolved in the monomer copolymerizable with the vinyl chloride remains constant throughout the reaction and thereby producing a uniform copolymer.

Various monomers can be copolymerized with vinyl chloride according to this invention so long as the monomer has a vapor pressure of approximately zero to prevent any significant variations in the dissolved vinyl chloride contact in the copolymerizable monomer throughout the reaction and to permit the maintenance of a constant vinyl chloride pressure above the reaction zone as well as being capable of being copolymerized with vinyl chloride. The copolymerizable monomer should also be insoluble in the copolymer being produced. Vinyl esters of high molecular weight fatty acids containing between about 12 and 18 carbon atoms have been found to be particularly suitable copolymerizable monomers which can be used according to this invention. The vinyl esters which can be used thus include vinyl stearate, vinyl palmitate, vinyl myristate, and vinyl laurate. The preferred vinyl ester is vinyl stearate. These vinyl esters have vapor pressures of approximately zero and they are also insoluble in the vinyl chloride-vinyl ester copolymer formed therewith.

The vinyl chloride copolymers produced according to this invention are true and uniform copolymers and can be defined as a mixture of vinyl chloride copolymers in which all of the copolymer molecules contain substantially the same ratio of randomly recurring groups of vinyl chloride moieties and moieties of the monomer copolymerized therewith. For example, the preferred vinyl chloride-vinyl ester copolymers produced according to this invention are true copolymers and can be defined as a mixture of vinyl chloride-vinyl ester copolymers in which all of the copolymer molecules contain substantially the same ratio of randomly recurring groups or moieties of

and

in which R is a saturated acyl radical containing between 12 and 18 carbon atoms.

Another product of this invention is a mixture of vinyl chloride copolymers in which each of the copolymer particles contains substantially the ratio of randomly recurring group of vinyl chloride moieties and moieties of the monomer copolymerized therewith. For example, the preferred vinyl chloride-vinyl ester copolymers produced according to this invention are a mixture of vinyl chloride-vinyl ester copolymer particles in which each of the copolymer particles contains substantially the same ratio of randomly recurring moieties of

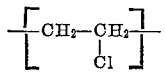

and

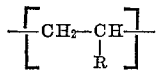

in which R is a saturated acyl radical containing between 12 and 18 carbon atoms. The products of this invention are substantially uniform insofar as the ratio of the vinyl chloride and vinyl ester moieties is concerned and is not a mixture of copolymers containing different ratios of vinyl chloride-vinyl ester moieties nor is there present in the product of this invention any vinyl chloride or vinyl ester homopolymers.

The reaction can be carried out by using well known suspending agents, catalysts, and buffers. The suspending agents which can be used can readily be selected by those skilled in the art and include polyvinyl alcohol, water soluble cellulose ethers, and so forth. The catalysts which can be used include oil-soluble, free radical polymerization catalysts such as organic peroxides, for example, lauroyl peroxide and benzoyl peroxide. Various basic buffers can also be used such as sodium bicarbonate as is also well known in the art.

The temperature of the copolymerization reaction can be varied as will be understood by those skilled in the art. It is preferred however to use a temperature between about 40 and 55° C.

As previously stated it is necessary to maintain a substantially constant pressure throughout the reaction in order to obtain a uniform copolymer. Variations in the pressure during the reaction will result in copolymer particles and molecules which will contain significantly different ratios of vinyl chloride and vinyl ester moieties which will result in a non-uniform mixture.

The particular pressure used can be preselected depending upon the ratio of vinyl chloride and vinyl ester moieties desired. Generally, as the pressure of the vinyl chloride is increased, so long as it is below the saturation pressure in the reaction medium, the vinyl chloride content in the copolymer will be correspondingly increased. Once the particular vinyl chloride content in the copolymer is selected, the vinyl chloride pressure is adjusted to secure the content selected and the pressure maintained constant throughout the reaction at the preselected temperature. It is preferred to maintain the pressure of vinyl chloride monomer between about 20 and 85 pounds per square inch. The vinyl chloride content at any particular pressure will also depend somewhat upon the particular monomer being copolymerized therewith. For example, a vinyl chloride pressure of about 72 p.s.i.g. when being copolymerized with vinyl stearate will result in a vinyl chloride-vinyl stearate copolymer containing about 66 percent by weight vinyl chloride. The copolymer composition is dependent on the vinyl chloride pressure and independent of the amount of copolymerizable monomer e.g. vinyl stearate in the reaction medium or zone.

Uniform and true copolymers are produced throughout the entire reaction term according to this invention. Analysis of the copolymer being produced at different stages of conversion clearly proves this fact. For example, a vinyl chloride-vinyl stearate reaction was performed using 1.0 part by weight lauroyl peroxide, 40 parts by weight vinyl stearate, 330 parts by weight water, 0.6 part by weight polyvinyl alcohol and 0.3 part by weight sodium bicarbonate. The reaction was carried out at a constant temperature of 52° C. and a constant vinyl chloride pressure of 70 p.s.i.g. A portion of the reaction product was removed and analyzed for chlorine content after the percent conversion reached 3, 11, 19.4, 54 and 83 percent. The following table shows the percent by weight content of the copolymer reaction product after the various percent conversions as noted above.

| Percent Conversion to Vinyl Chloride- Vinyl Stearate Copolymer | Percent by Weight Vinyl Chloride | Percent by weight Vinyl Stearate |
|---|---|---|
| 3 | 66 | 34 |
| 11 | 65 | 35 |
| 19.4 | 63.5 | 36.5 |
| 54 | 65 | 35 |
| 83 | 66 | 34 |

It is evident from these results that uniform copolymers are obtained according to this invention throughout the reaction. The slight difference in vinyl chloride and vinyl stearate reported above can be considered experimental error or due to slight variations in the vinyl chloride pressure during the approximately 20 hour reaction period.

The process of this invention can also be carried out continuously and the copolymer composition or the ratio of vinyl chloride to vinyl ester varied or changed without shutting down the reaction simply by changing the pressure of the vinyl chloride in the autoclave. There will of course be some non-uniform copolymers formed during the pressure change but the amount of such waste products could be maintained at a minimum.

The process of this invention can be carried out by continuous introduction of the vinyl chloride monomer into an autoclave containing the copolymerizable monomer and other materials and maintained at a constant pressure by means of a constant pressure regulator. The temperature and pressure of the vinyl chloride tank can be maintained slightly below the pressure and temperature used to carry out the copolymerization. As the copolymerization proceeds, the copolymer particles drop to the bottom of the autoclave as they are formed and can be readily removed therefrom.

As the percentage of vinyl ester is increased in the copolymer, it of course begins to lose its vinyl chloride properties and begins to predominantly exhibit the properties of the vinyl ester homopolymer. Those products which contain a high percentage of vinyl chloride have the properties of an externally plasticized vinyl chloride homopolymer and are useful in the same areas and to the same extent as the vinyl chloride homopolymer. Those copolymers which predominantly exhibit properties of the vinyl ester homopolymer are also useful in the same areas as the vinyl ester homopolymers.

*Example 1*

27,180 parts of water together with 27 parts of sodium bicarbonate, 72 parts of polyvinyl alcohol as a 40 percent aqueous solution (PVA–40), 3,735 parts of vinyl stearate, and 37 parts of lauroyl peroxide were charged into an autoclave. The autoclave was heated and connected to a pressure tank containing vinyl chloride monomer. The reactants in the autoclave were then heated to a temperature of 53° C. and the reaction pressure adjusted in the autoclave to 72 pounds per square inch gauge. The pressure in the vinyl chloride monomer tank was adjusted to about 71 pounds per square inch gauge and also heated to a temperature of about 48° C. The copolymerization reaction thus initiated was continued for approximately 22 hours during which time the pressure was maintained substantially constant at about 72 pounds per square inch gauge in the autoclave and the temperature substantially constant at about 53° C.

After 22 hours the reaction was complete and the autoclave was shut down and cooled. The polymer was allowed to settle and the aqueous layer decanted. The polymer was then washed four times with hot tap water and four times with isopropyl alcohol. The resulting vinyl chloride-vinyl stearate copolymer was then dried in a vacuum oven overnight. The vinyl chloride-vinyl stearate copolymer weighed 4,272 grams. Analysis showed the percent by weight of chlorine to be 37.15 which is equivalent to 66 percent by weight of vinyl chloride in the copolymer. The iodine number was 0.38 and the intrinsic viscosity of the polymer 0.66. The resulting particles were determined to be porous spheres and having particle sizes ranging from 0.08 to 0.28 millimeter with the mean particle size being approximately 0.14 millimeter. Infra red tests on the product showed a disappearance of the strong band of the polyvinyl stearate at $13.9\mu$ while the c.=0 at $5.75\mu$ remained, a wave length shift of a band at $13.2\mu$ and intensification far in excess of the contribution of polyvinyl chloride plus polyvinyl stearate alone, disappearance of polyvinyl stearate bands at 6.85 and $8.6\mu$ and an additional wave length shift of a band at $12.1\mu$. X-ray diffractions of the vinyl chloride-vinyl stearate copolymer disclosed a total of 18 "$d$" spacings. When compared to the diffraction pattern of polyvinyl chloride and polyvinyl stearate homopolymers some of the "$d$" spacings could be correlated with those of the reference material but no combination accounted for the entire pattern of the vinyl chloride-vinyl stearate copolymer thus clearly showing that the vinyl chloride-vinyl stearate copolymer is a true copolymer and not a mixture of several polymers.

A film was cast from the product produced according to this example which was clear and possessed all of the properties of an externally plasticized polyvinyl chloride homopolymer film. The cast film had a tensile strength of about 3345 lbs./sq. in., a modulus of elasticity under tension of 29,550 lbs./sq. in., a second order transition temperature of 21° C., an elongation of about 335%, a Clashberg brittleness temperature of 23° C. and a flexural stiffness at 73° F. of about 70,000 lbs./sq. in.

*Example II*

The same procedure was repeated as in Example I using the same reactants and temperature but employing an autoclave pressure of 82 pounds per square inch gauge instead of 72 pounds per square inch gauge, as used in Example I. The reaction was continued for approximately 22 hours. The resulting vinyl chloride-vinyl stearate copolymer was removed from the autoclave and washed in the same manner as the product of Example I. Analysis of the copolymer showed a chlorine content of 40.5 percent by weight which is equivalent to 71 percent by weight vinyl chloride in the copolymer. The iodine number of the copolymer was 0.24 and the intrinsic viscosity 0.7.

Films were easily cast from the copolymer produced according to this example which were clear and possessed all of the properties normally associated with externally plasticized vinyl chloride homopolymers.

*Example III*

The same procedure was repeated as in Example I using 300 grams of water, 20 grams of a 40% polyvinyl alcohol solution, 0.3 gram of sodium bicarbonate, 41.5 grams of lauroyl peroxide. The vinyl chloride pressure was maintained constant at 76 p.s.i.g. and the reaction temperature maintained at 51° C. The reaction was continued for about 20 hours and the copolymer recovered. The resulting copolymer had an intrinsic viscosity of 0.66, an iodine number of 0.25, a chlorine content of 42.6% by weight which is equal to 75.2% by weight vinyl chloride. Cast films were clear, had a tensile strength of 5450 lbs./sq. in. and a modulus of elasticity under tension of 169,700 lbs./sq. in.

To further show the nature of the copolymers produced according to this invention a vinyl chloride-vinyl stearate copolymer produced in substantially the same manner as set forth in Example III was dissolved in tetrahydrofuran and precipitated from hexane. Polyvinyl chloride, polyvinyl stearate and the copolymer are all soluble in tetrahydrofuran while polyvinyl chloride and the copolymer are insoluble in hexane, while polyvinyl stearate is completely soluble in hexane. Prior to the attempted fractional precipitation, the copolymer analyzed 79% by weight vinyl chloride and 21% by weight vinyl stearate. After being dissolved and precipitated as above described the copolymer composition remained unchanged clearly showing that a true copolymer was formed free from any homopolymer.

The vinyl chloride-vinyl ester copolymers of this invention can be used as plastisols, or molded into films and other articles of manufacture such as extrusion coated wire, clear garden hose, phonograph records and so forth, and can generally be used with fillers, segments, modifiers and so forth in the same manner as plasticized vinyl chloride homopolymers.

I claim:

1. A process for preparing true and uniform copolymers of vinyl chloride and a substantially non-volatile vinyl ester of a monocarboxylic acid containing from about 12 to 18 carbon atoms which comprises introducing vinyl chloride vapor into a reaction zone containing said vinyl ester, maintaining the vapor pressure of vinyl chloride in said reaction zone at a constant level which is less than the saturation pressure of vinyl chloride in said reaction zone, and recovering a uniform copolymer of vinyl chloride and a vinyl ester of a carboxylic acid containing from about 12 to 18 carbon atoms.

2. A process for preparing true and uniform copolymers of vinyl chloride and a substantially non-volatile vinyl ester of a monocarboxylic acid containing from about 12 to 18 carbon atoms which comprises introducing vinyl chloride into a reaction zone containing an aqueous suspension of said vinyl ester, maintaining the vapor pressure of vinyl chloride in said reaction zone at a constant level which is less than the saturation pressure of vinyl chloride in said reaction zone, and recovering a uniform copolymer of vinyl chloride and a vinyl ester of a carboxylic acid containing from about 12 to 18 carbon atoms.

3. A process for preparing true and uniform copolymers of vinyl chloride and a substantially non-volatile vinyl ester of a monocarboxylic acid containing from about 12 to 18 carbon atoms which comprises introducing vinyl chloride vapor into a reaction zone containing said vinyl ester, maintaining the vapor pressure of vinyl chloride in said reaction zone at a constant level in the range of 20 to 85 pounds per square inch, and recovering a uniform copolymer of vinyl chloride and a vinyl ester of a monocarboxylic acid containing from about 12 to 18 carbon atoms.

4. A process for preparing true and uniform copolymers of vinyl chloride and a substantially non-volatile vinyl ester of a monocarboxylic acid containing from about 12 to 18 carbon atoms which comprises introducing vinyl chloride into a reaction zone containing an aqueous suspension of said vinyl ester, maintaining the vapor pressure of vinyl chloride in said reaction zone at a constant level in the range of 20 to 85 pounds per square inch, maintaining the temperature in said reaction zone in the range of about 40° to 55° C., and recovering a uniform copolymer of vinyl chloride and a vinyl ester of a monocarboxylic acid containing from about 12 to 18 carbon atoms.

5. A process for preparing true and uniform copolymers of vinyl chloride and vinyl stearate which comprises introducing vinyl chloride into a reaction zone containing an aqueous suspension of vinyl stearate, maintaining the vapor pressure of vinyl chloride in said reaction zone at a constant level in the range of 20 to 85 pounds per square inch, maintaining the temperature in said reaction zone in the range of about 40° to 55° C., and recovering a uniform copolymer of vinyl chloride and vinyl stearate.

References Cited in the file of this patent

UNITED STATES PATENTS

| | | |
|---|---|---|
| 2,100,900 | Fikentscher et al. | Nov. 30, 1937 |
| 2,118,864 | Reppe et al. | May 31, 1938 |
| 2,689,242 | Lucht | Sept. 14, 1954 |
| 2,746,944 | Naps et al. | May 22, 1956 |
| 2,756,219 | Van Der Plas et al. | July 24, 1956 |
| 2,904,409 | Bolstad | Sept. 15, 1959 |

FOREIGN PATENTS

| | | |
|---|---|---|
| 487,593 | Great Britain | June 22, 1938 |

OTHER REFERENCES

Marvel et al.: Journal of Polymer Science, vol. XXVIII, No. 115, pp. 39–58 (1958).